Figure 1:
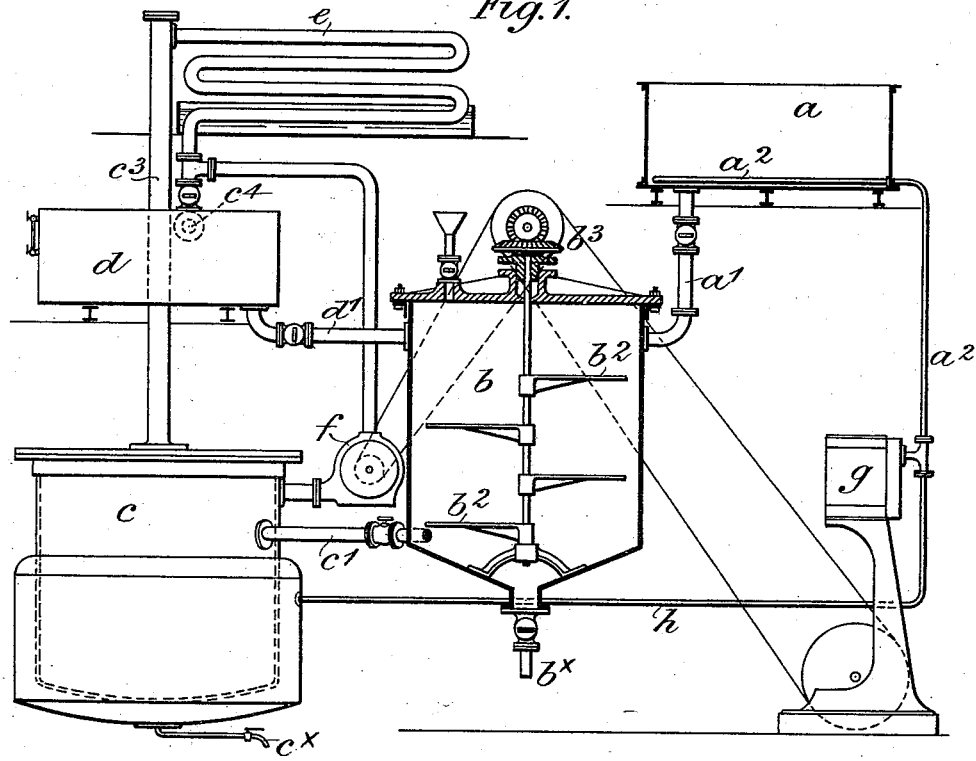

(No Model.)

F. N. TURNEY.
PROCESS OF PURIFYING SOD OIL.

No. 536,163. Patented Mar. 19, 1895.

Witnesses
Chas H. Smith
J. Staib

Inventor
F. N. Turney
per Lemuel W. Serrell
Atty.

UNITED STATES PATENT OFFICE.

FREDERICK NICHOLSON TURNEY, OF NOTTINGHAM, ENGLAND.

PROCESS OF PURIFYING SOD-OIL.

SPECIFICATION forming part of Letters Patent No. 536,163, dated March 19, 1895.

Application filed March 30, 1893. Serial No. 468,281. (No specimens.) Patented in England January 21, 1893, No. 1,349.

*To all whom it may concern:*

Be it known that I, FREDERICK NICHOLSON TURNEY, a subject of the Queen of Great Britain and Ireland, residing at Nottingham, in the county of Nottingham, England, have invented a certain new and useful Method for Treating and Purifying Sod-Oil, (for which Letters Patent have been granted to me in Great Britain, dated January 21, 1893, No. 1,349;) and I do hereby declare that the following is a full, clear, and exact description of the same.

In the manufacture and preparation of chamois leather for the market the same is treated with cod liver oil. The leather is then dressed and put under hydraulic pressure, which pressure squeezes out from the chamois skins or leather an oily mixture called sod oil, which sod oil is composed of the cod liver oil mixed with water and contaminated with grit, fiber, glutinous and greasy matters and other impurities from the chamois skin. Furthermore this oil is too thick, and the water and impurities too intimately mixed therewith to be separated therefrom by settlement even when heated. In order to render the oil at all useful, this water has to be evaporated by heat, but then the other impurities still, however, remain in the oil. With the oil even thus treated and used on leather for giving weight and suppleness thereto or for the purpose of currying heavy leather, the gluey impurities are apt to set on the surface of the leather and to form thereon a size which prevents the oil from penetrating the leather and leaves its surface glazed and imperfect. Besides which, as the oil contains more or less coloring matter derived from the skins, it is liable to stain the leather it is used on and impart a dark color thereto, and the object of my invention is to overcome these difficulties.

My invention relates to a new and improved method of purifying this sod oil for its utilization, so that the same is not wasted but that the product (a suitable oil) can be re-employed in preparing or currying leather for various uses in the arts.

Now, by my process of treating sod oil, I obtain an oil suitable for currying or other purposes, which is pure and uniform in quality, free from water, of a desirable consistency, and one which does not color or stain the goods upon which it is used.

According to my invention and when treating sod oil, the crude oil is first heated to make it flow, and then admitted to a vapor-tight mixing vessel, or vessels, wherein it is mixed with a suitable diluent such as a hydrocarbon and the mixture treated by agitation until the oily part of the crude oil becomes thinner by mixing with the diluent.

The specific gravity of the mixture is reduced to such an extent that after agitation has ceased and the oil is allowed to stand, the refinement takes place by settlement. The clear oil and spirit remain above the water and refuse materials and they are then run off into a still or steam pan and the spirit or diluent vaporized from the oil. The diluent vapor is then condensed and in a liquid form returned to the tank or reservoir from which it was originally taken and from which it can be drawn again when desired into the mixing vessel for use over again. The diluent having thus been vaporized, the purified oil remains behind in the still or steam pan, from which it can be drawn off and placed in receptacles for use, as required.

In order that my invention may be readily understood I will describe the same fully with reference to the accompanying drawings, which show an apparatus capable of carrying out my method as applied to the treatment of crude sod oil.

Figure 2:
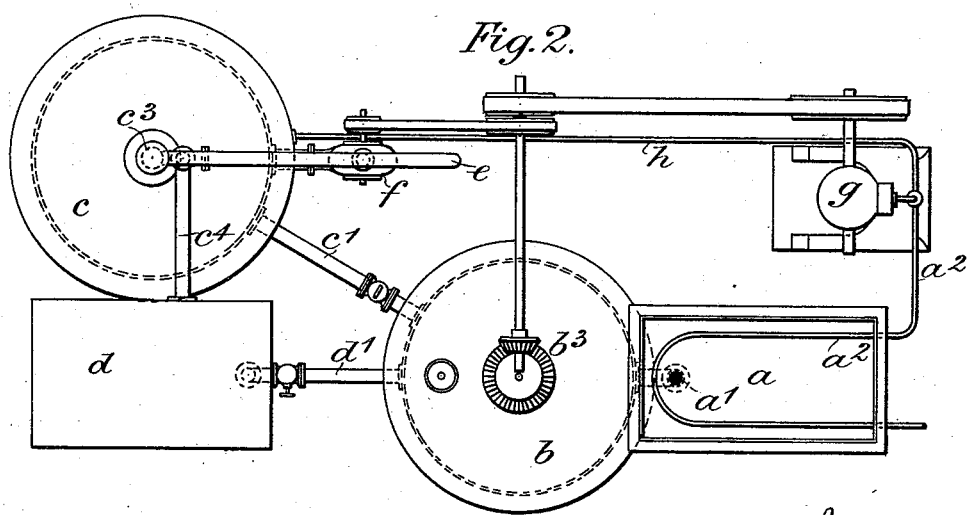

Figure 1 is an elevation partly in section, and Fig. 2 a plan of a suitable apparatus or plant for use with my process.

$a$ is a collecting tank in which the crude oil coming from the press is received and heated by a steam pipe $a^2$ or in any other suitable manner sufficiently to cause it to flow readily. This oil thus brought to a sufficient consistency is then led into a vapor-tight mixing vessel $b$ or into several such vessels, each of which is preferably conical at the bottom and provided with stirring arms or tines $b^2$ actuated by suitable gearing $b^3$, or the oil may be agitated within the mixing vessel, or vessels, by any other well known means.

Before or while the oil is agitated in the mixing vessel I add to it a suitable quantity, about its own bulk, of a diluent such as petroleum spirit, or some other light hydrocarbon, but instead of petroleum spirit any suitable diluent such as chloroform or carbon bisulphide may be used in sufficient quantity to render the oil capable of refining by settlement. After agitating the mixture for some time, say about twenty-four hours, the oily part of the crude oil becomes thinner and mixes with the spirit or diluent, the specific gravity becomes reduced, and finally the mixture becomes so thin that the water and other impurities can separate from it. The stirring is then stopped and the mixture is allowed to settle for a sufficient time so that the water and impurities may fall from the mixed oil and solvent to the bottom of the vessel. The mixture may be allowed to settle in the mixing vessel or in a distinct settling tank, or when more than one mixing vessel is employed, the stirring may be performed in some of the vessels, while others are used for allowing the mixture to settle, cocks being suitably arranged to cut off communication between the vessels. After settlement, the clear oil and spirit are run off from the settling tank or mixing vessel through a pipe $c'$ situated at a convenient level, and conducted into a still or steam jacketed evaporating pan $c$ which may be heated by steam coming from the engine $g$ through the pipe $h$. The impure water and sediment are also drawn off from the mixing vessel $b$ through a cock $b^\times$. In the steam pan the spirit or diluent is vaporized from the oil and rises through a tube $c^3$ to condensing coils $e$ which may be cooled in any well known manner, and through which it is forced or drawn by a fan or blower $f$ driven by any suitable engine $g$. After passing through the condensing coils the liquid diluent is collected in a reservoir tank $d$ to which it is conducted by a pipe $c^4$. This reservoir tank $d$ is situated at such a level above the mixing vessel that the said spirit or diluent may be run thence through a pipe $d'$ without the aid of pumps into the mixing vessel to be used over again. When the spirit is vaporized from the oil, the purified oil is drawn off for use through the cock $c^\times$. The spirit or diluent being distilled in a closed circuit, that is to say, one which is not open to the air, is wholly or almost wholly recovered.

On account of the complete separation of all the water from the oil, and of the impurities which are all heavier than the oil, a large amount of the coloring matter is extracted, mostly in solution in the water. After the water is drawn off, a small amount of sedimentary matter mixed with water, oil and spirit flows from the vessel, and is collected and treated with petroleum spirit or diluent to separate the remaining oil. If total separation of coloring matter is required, the oil, preferably while mixed with the spirit in the mixing vessel, is washed with warm water, or warm water and diluent admitted thereto. The oil may thus be mixed and washed and allowed to settle repeatedly until all the coloring matter is removed and the oil rendered useful for purposes where absence of stain is essential.

I claim as my invention—

The process of purifying sod oil, which consists in heating the crude oil to cause it to flow, then running it into a vapor-tight vessel with petroleum spirit or other suitable diluent and agitating them until thoroughly mixed together, then allowing the mixture to remain quiescent to deposit suspended impurities, withdrawing the mixture of oil and spirit, and evaporating such spirit so as to leave behind the purified sod oil, and recovering the spirit for further use, substantially as described.

In witness whereof I have hereunto signed my name in the presence of two subscribing witnesses.

FREDERICK NICHOLSON TURNEY.

Witnesses:
C. D. HEARN, Jr.,
6 *Victoria Street, Nottingham, England.*
ISAAC GALE,
*Nottingham.*